(12) United States Patent
Chiesa

(10) Patent No.: US 10,596,930 B2
(45) Date of Patent: Mar. 24, 2020

(54) TRACKABLE BABY CARRIAGE WITH DETACHABLE AND TRACKABLE CAR SEAT

(71) Applicant: Melissa Chiesa, Burlingame, CA (US)

(72) Inventor: Melissa Chiesa, Burlingame, CA (US)

(*) Notice: Subject to any disclaimer, the term of this patent is extended or adjusted under 35 U.S.C. 154(b) by 0 days.

(21) Appl. No.: 16/041,809

(22) Filed: Jul. 22, 2018

(65) Prior Publication Data

US 2020/0023755 A1    Jan. 23, 2020

(51) Int. Cl.
*B60N 2/28* (2006.01)
*G08B 21/02* (2006.01)

(52) U.S. Cl.
CPC ......... *B60N 2/2848* (2013.01); *B60N 2/2845* (2013.01); *G08B 21/0269* (2013.01)

(58) Field of Classification Search
CPC ........... B62B 7/00; B62B 9/24; B60N 2/2848; B60N 2/2845; G08B 21/0269
See application file for complete search history.

(56) References Cited

U.S. PATENT DOCUMENTS

| 5,727,798 A * | 3/1998 | Walters ................. B62B 7/08 |
| | | 280/30 |
| 9,378,641 B2 * | 6/2016 | Beumler ............... B60N 2/28 |
| 9,656,682 B2 * | 5/2017 | Ahlemeier ............. B62B 9/08 |
| 10,166,890 B1 * | 1/2019 | Beard .................. B60N 2/5657 |
| 2013/0131930 A1 * | 5/2013 | Kwong ................. B62B 9/005 |
| | | 701/45 |
| 2017/0352251 A1 * | 12/2017 | de Barros Chapiewski ............. |
| | | H04W 4/029 |

* cited by examiner

*Primary Examiner* — Bryan A Evans
(74) *Attorney, Agent, or Firm* — The Iwashko Law Firm, PLLC; Lev Ivan Gabriel Iwashko

(57) ABSTRACT

A trackable baby carriage system, including a trackable baby carriage to communicate with a mobile device, and a detachable and trackable car seat detachably disposed within the trackable baby carriage to hold a child therein and to communicate with the mobile device, such that the mobile device independently tracks a location of the trackable baby carriage and the detachable and trackable car seat.

3 Claims, 1 Drawing Sheet

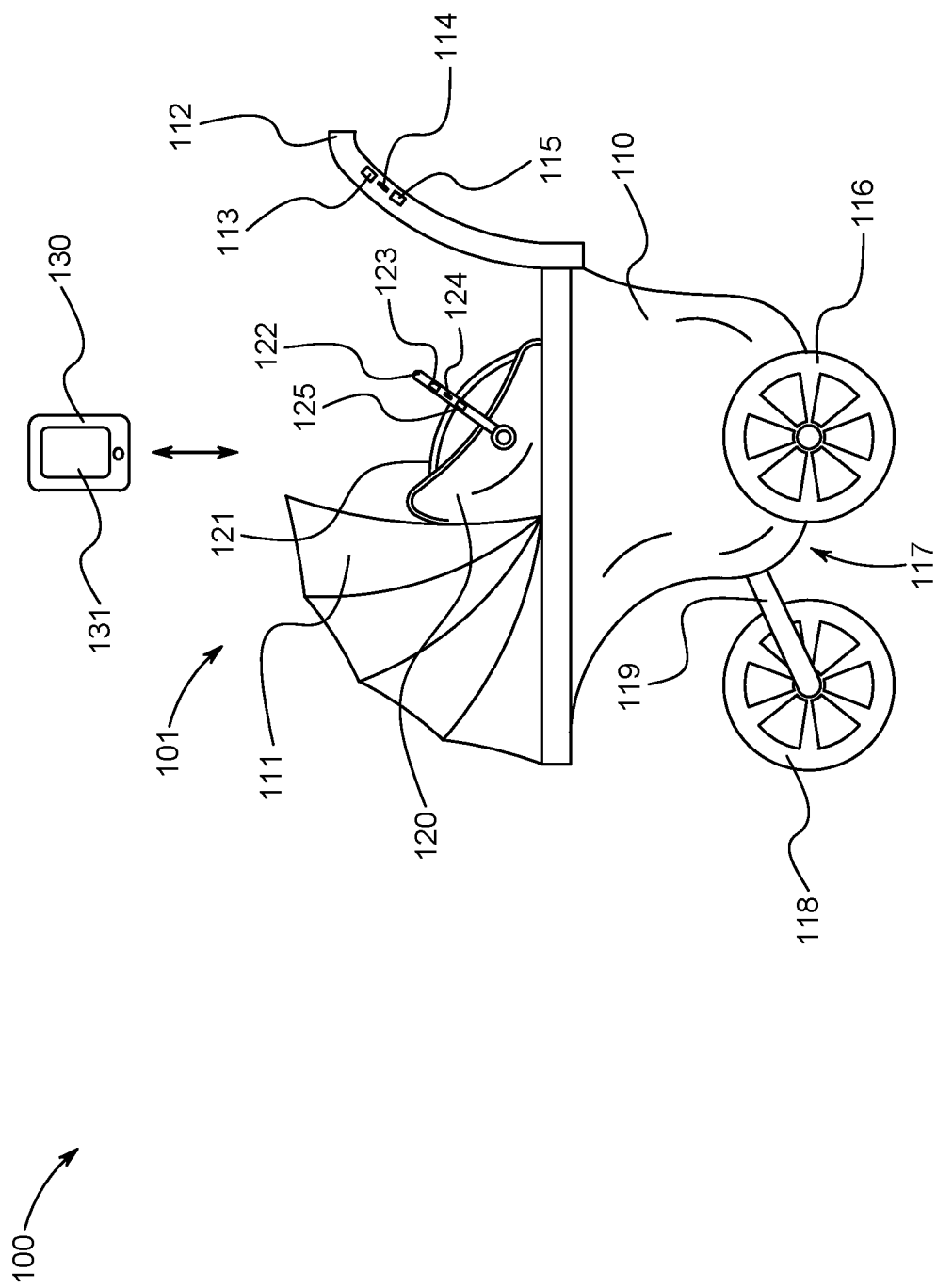

TRACKABLE BABY CARRIAGE WITH DETACHABLE AND TRACKABLE CAR SEAT

BACKGROUND

1. Field

The present general inventive concept relates generally to a baby carriage, and particularly, to a baby carriage having a trackable baby carriage having a detachable and trackable car seat integrated therewith.

2. Description of the Related Art

Existing household central AC systems and central heating systems provide a very limited degree of local control over the temperature in the various rooms of a house. The typical existing system has a single, centrally located thermostat, whereby local temperature in each room is controllable only by means of one or two manually operated vents. But these existing vents only partially block the flow of air, restricting those who do not have control over that central thermostat to an often uncomfortably cold (or hot) environment. Also, these existing systems often result in the waste of considerable amounts of energy due to the unnecessary cooling or heating of unoccupied rooms and wasted energy equals wasted money.

Keeping an eye on children can be difficult because it is impossible to be with them all the time. Entrusting babysitters and close friends or family members to take care of babies and children can be comforting, but having a way to monitor the location of where they are can bring peace of mind, especially when the baby is in a stroller or car seat.

Therefore, there is a need for a baby stroller with a built in detachable car seat that each possess GPS devices that can independently be tracked using a smartphone app.

SUMMARY

The present general inventive concept provides a trackable baby carriage having a detachable and trackable car seat integrated therewith.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a trackable baby carriage system, including a trackable baby carriage to communicate with a mobile device, and a detachable and trackable car seat detachably disposed within the trackable baby carriage to hold a child therein and to communicate with the mobile device, such that the mobile device independently tracks a location of the trackable baby carriage and the detachable and trackable car seat.

The trackable baby carriage may include a carriage GPS tracker to emit a GPS signal to allow the mobile device to track the location of the trackable baby carriage.

The detachable and trackable car seat may include a car seat GPS tracker to emit a GPS signal to allow the mobile device to track the location of the detachable and trackable car seat.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates a trackable baby carriage system having a trackable baby carriage, a detachable and trackable car seat integrated therewith to communicate with a mobile device, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the FIGURES, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

FIG. 1 illustrates a trackable baby carriage system 100 having a trackable baby carriage 101, a detachable and trackable car seat 120 integrated therewith to communicate with a mobile device 130, according to an exemplary embodiment of the present general inventive concept.

The trackable baby carriage 101 may be shaped like any type of carriage known to one of ordinary skill in the art, and may be constructed from metal, plastic, rubber, wood, cloth, etc., but is not limited thereto.

The trackable baby carriage system 100 may include the trackable baby carriage 101, the detachable and trackable car seat 120, and the mobile device 130. Although the trackable baby carriage 101, the detachable and trackable car seat 120, and the mobile device 130 may be wirelessly connected to each other as a system of the trackable baby carriage system 100, they may each be provide separately an independently, or as a single unit.

The mobile device 130 may be any type of mobile device that can access the Internet, satellite services, 3G, 4G, or any other type of wireless communication system, an may be a cell phone, a laptop computer, a desktop computer, a tablet computer, etc., but is not limited thereto. The mobile device 130 may have an application and/or program running thereupon that allows communication between the mobile device 130 and the trackable baby carriage 101 and the detachable and trackable car seat 120.

The trackable baby carriage 101 may include a main body 110, a sunshield 111, a carriage handle 112, a carriage battery life display 113, a carriage USB port 114, a carriage GPS tracker 115, a first wheel 116, a second wheel 117, a third wheel 118, and a wheel attachment portion 119.

The main body 110 may include an area to place a child either directly within the main body 110, or within the detachable and trackable car seat 120.

The sunshield 111 may be disposed at a first and of the main body 110, and may be disposed at least partially over the main body 110 to shield a child disposed within the main body 110 or within the detachable and trackable car seat 120, from the sun and/or rain.

The carriage handle 112 may be disposed at an end opposite from the end of the main body 110 where the sunshield 111 is disposed, and may be used to push the trackable baby carriage 101.

The carriage battery life display 113, the carriage USB port 114, and the carriage GPS tracker 115 may all be disposed on the carriage handle 112, but is not limited thereto, and may be disposed anywhere on the trackable baby carriage 101.

The carriage battery life display 113 may display a level of a charge of a battery disposed within the trackable baby carriage 101.

The carriage USB port 114 may be a port to allow the battery within the trackable baby carriage 101 to be charged via a USB cable.

The carriage GPS tracker 115 may communicate with the mobile device 130, to allow the trackable baby carriage 101 to be tracked via a GPS signal. More specifically, the carriage GPS tracker 115 may emit a GPS signal to allow the mobile device 130 to track the location of the trackable baby carriage 101. The mobile device 130 may include a display 131 to display the location of the trackable baby carriage 101 on a map.

The first wheel 116 and the second wheel 117 may be disposed on left and right sides of a bottom portion of the main body 110. The third wheel 118 may be disposed at a front bottom portion of the main body 110, and may be attached to the main body 110 via a wheel attachment portion 119.

The detachable and trackable car seat 120 may include a safety harness 121, a car seat handle 122, a car seat battery life display 123, a car seat USB port 124, and a car seat GPS tracker 125.

The safety harness 121 may allow the child disposed within the detachable and trackable car seat 120 to be safely harnessed therein.

The car seat handle 122 may allow the detachable and trackable car seat 120 to be carried.

The car seat battery life display 123 may display a level of a charge of a battery disposed within the detachable and trackable car seat 120.

The car seat USB port 124 may be a port to allow the battery within the detachable and trackable car seat 120 to be charged via a USB cable.

The car seat GPS tracker 125 may communicate with the mobile device 130, to allow the detachable and trackable car seat 120 to be tracked via a GPS signal. More specifically, the car seat GPS tracker 125 may emit a GPS signal to allow the mobile device 130 to track the location of the detachable and trackable car seat 120. The mobile device 130 may include the display 131 to display the location of the detachable and trackable car seat 120 on a map.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A trackable baby carriage system, comprising:
   a trackable baby carriage to communicate with a mobile device, the trackable baby carriage comprising:
   a main body to receive a child therein,
   a carriage handle disposed on an end of the main body to facilitate pushing of the trackable baby carriage, and
   a carriage USB port disposed on at least a portion of the carriage handle to charge a battery within the trackable baby carriage; and
   a detachable and trackable car seat detachably disposed within the trackable baby carriage to receive the child therein while the detachable and trackable car seat is within the main body, and to communicate with the mobile device, the detachable and trackable car seat comprising:
   a car seat handle to allow the detachable and trackable car seat to be carried, and
   a car seat USB port disposed on at least a portion of the car seat handle to charge another battery disposed within the detachable and trackable car seat, such that the mobile device tracks a location of at least one of the trackable baby carriage and the detachable and trackable car seat.

2. The trackable baby carriage system of claim 1, wherein the trackable baby carriage further comprises:
   a carriage GPS tracker to emit a GPS signal to allow the mobile device to track the location of the trackable baby carriage.

3. The trackable baby carriage system of claim 1, wherein the detachable and trackable car seat further comprises:
   a car seat GPS tracker to emit a GPS signal to allow the mobile device to track the location of the detachable and trackable car seat.

* * * * *